April 24, 1962  L. E. SODERQUIST  3,030,658
PRESS FOR SHAPING AND CURING PNEUMATIC TIRES
Filed May 19, 1959  6 Sheets-Sheet 1

INVENTOR.
LESLIE E. SODERQUIST
BY
ATTORNEYS

INVENTOR.
LESLIE E. SODERQUIST
BY
Ely, Frye & Hamilton
ATTORNEYS

April 24, 1962  L. E. SODERQUIST  3,030,658
PRESS FOR SHAPING AND CURING PNEUMATIC TIRES
Filed May 19, 1959  6 Sheets-Sheet 3
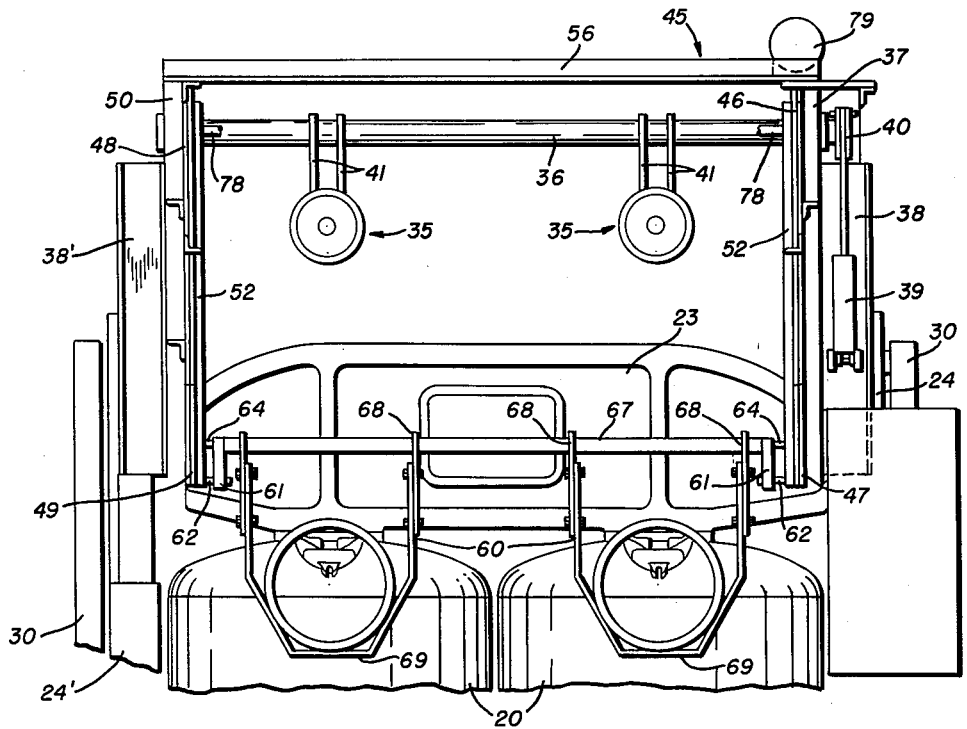
FIG. 4
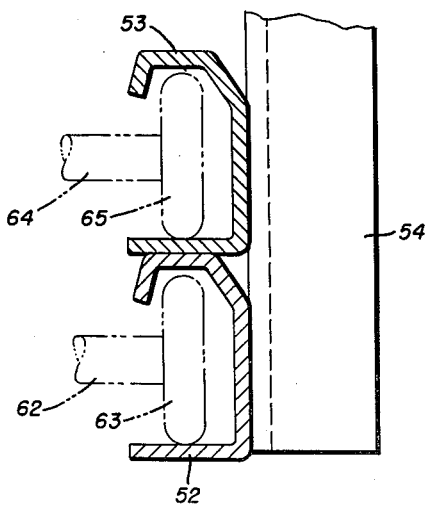
FIG. 5
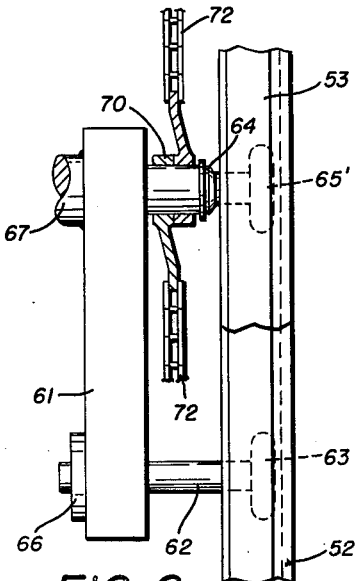
FIG. 6
INVENTOR.
LESLIE E. SODERQUIST
BY 
ATTORNEYS

INVENTOR.
LESLIE E. SODERQUIST

INVENTOR.
LESLIE E. SODERQUIST
BY Ely, Frye & Hamilton
ATTORNEYS

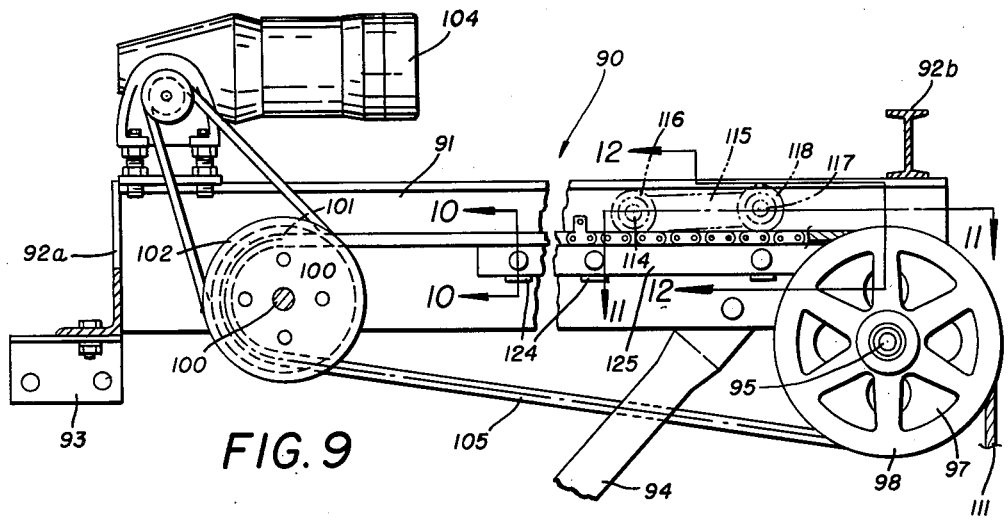
FIG. 9
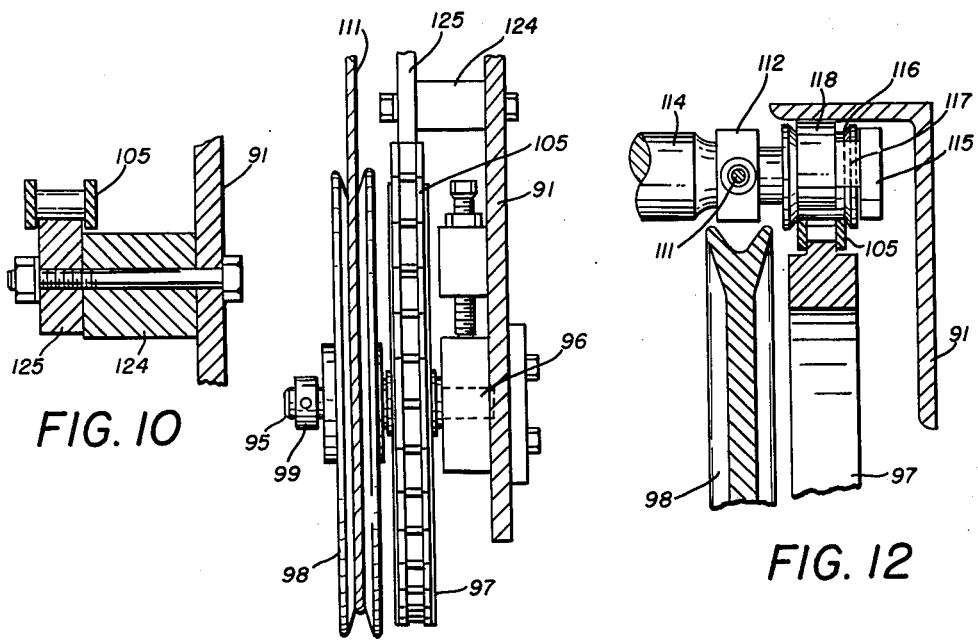
FIG. 10
FIG. 11
FIG. 12

United States Patent Office 3,030,658
Patented Apr. 24, 1962

3,030,658
PRESS FOR SHAPING AND CURING PNEUMATIC TIRES
Leslie E. Soderquist, Silver Lake, Ohio, assignor to The McNeil Machine & Engineering Company, Akron, Ohio, a corporation of Ohio
Filed May 19, 1959, Ser. No. 814,311
11 Claims. (Cl. 18—2)

The present invention relates to improvements in presses wherein unvulcanized tire bands are shaped and cured in separable mold sections. More particularly, the invention relates to improvements in the loading and positioning of uncured tire bands in a press having separable upper and lower mold sections which when open are adapted to receive an uncured band in operative position with respect to the press; that is, in registry with a mold section. The invention specifically relates to a press having stationary upright members on opposite sides of the mold sections, at least one transfer device supported between the upright members to locate an uncured band in registry with a mold section, and a correlated conveyor mechanism supported by the upright members and cooperating with the transfer device in a coordinated manner for delivery or supply of uncured tire bands.

The conveyor mechanisms of the invention are intended to improve the operation of presses adapted and constructed for shaping and curing tires in an automatic manner or fashion. The conveyor mechanism disclosed herein promotes the progress of the arts of tire manufacture in that uncured tire bands, built in locations remote from the tire presses and delivered by conveyors, lift trucks, etc., are efficiently transferred from the delivery apparatus, handled without deformation or distortion, and positioned for ease of engagement by transfer devices associated with the press.

It is therefore an object of the invention to improve the operation of an automatic loading press for the shaping and curing of unvulcanized tire bands.

It is a further object to provide an improved concept of press operation whereby an uncured tire band may be transferred from a delivery means, handled without additional deformation and readily engaged by a transfer device associated with an automatic loading press.

Specifically, it is an object to provide correlated conveyor mechanisms for cooperative use in a coordinated manner with automatic loading presses having transfer devices which receive an uncured tire band at a side or front of the press and move over a mold section when the press is open to deposit the uncured tire band for shaping and curing.

These and other objects of the invention, as well as the advantages thereof, will be apparent in view of the following detailed description when taken in conjunction with the attached drawings.

In the drawings:

FIG. 4 is a front elevation of the press and correlated conveyor mechanism as seen in the positions of FIG. 1;

FIG. 5 is an enlarged detail taken substantially as indicated on line 5—5 of FIG. 1;

FIG. 6 is a slightly smaller detail taken substantially as indicated on line 6—6 of FIG. 1;

FIG. 9 is an enlarged fragmentary elevation of the press conveyor mechanism of FIG. 7;

FIG. 10 is a detail taken substantially as indicated on line 10—10 of FIG. 9;

FIG. 11 is another detail taken substantially as indicated on line 11—11 of FIG. 9; and FIG. 12 is yet another detail taken substantially as indicated on line 12—12 of FIG. 9.

*General Description*

Figure 1:
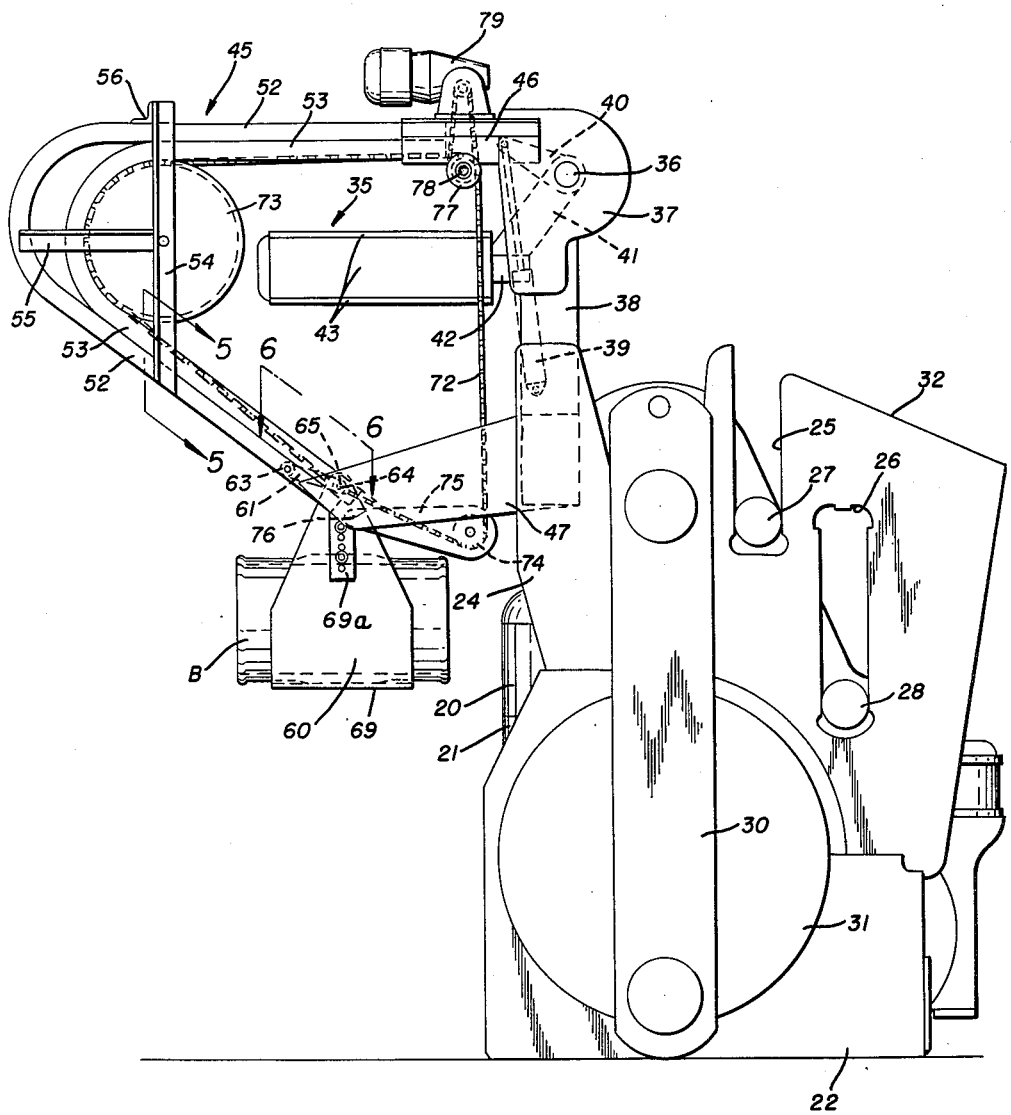
FIG. 1 is a side elevation of a press and correlated conveyor mechanism for unvulcanized tire bands of passenger car size.

The presses of the invention, as best shown in FIGS. 1, 4, 7 and 8, have a general construction and operating mechanisms as shown in a number of prior art patents and applications of the inventor, including United States Patent No. 2,808,618 to which reference is made for such details as are required to more fully understand the invention. The presses according to Patent No. 2,808,-618 are constructed so that it is possible to obtain a maximum "tilt-back" of the upper mold section 20 and clearance above the lower mold section 21. This type of press is preferred, but it will be apparent that presses of other types and designs could be used in the practice of the invention so long as an uncured band can be registered with a lower mold section 21 when the press is open.

The presses as shown may be used with or without an inflatable bag or diaphragm. The mechanism for shaping the tire may be of the permanent bag or diaphragm type as shown in Patent No. 2,808,618 or may be of the bagless cure type such as shown in the inventor's U.S. Patents Nos. 2,812,544; 2,812,545 or 2,812,546.

Referring to the drawings, the lower or stationary mold sections 21 are carried on a base 22. The movable upper mold sections are supported from a crosshead 23. On opposite sides of the lower mold sections 21 are guide plates 24 extending upwardly from the base 22. Each guide plate 24 has two parallel front and rear guideways 25 and 26. At each end of the crosshead are guiding arms having front and rear rollers 27 and 28, receivable in the respective guideways 25 and 26. The crosshead 23 is pivoted to the upper end of a pair of operating links 30 on opposite sides of the press and outside of the guide plates 24. The links 30 are actuated by large motor driven bull gears 31 to raise the crosshead. During the opening movement, the rollers 27 and 28 first move to the upper end of their guideways 25 and 26. Then, the front rollers move along a backwardly and downwardly inclined surface 32 on the guide plates 24 while the rear rollers 28 move downwardly in the rear guideways 26 until the crosshead 23 is positioned over top of the guide plates 24.

The uncured band transfer devices, indicated generally at 35, are carried by and preferably mounted radially of a shaft 36 which extends across the press above the lower mold section 21. The shaft 36 is journaled at its ends for rotation. At one front corner of the press, shaft 36 rotates in a housing 37 carried at the upper end of a vertical I-beam 38 attached to the inside surface of an upright guide plate 24. The housing 37 encloses the mechanism for rotating the shaft 36 to move the transfer devices 35 toward and away from the lower mold sections 21. As shown, the rotating mechanism may be a cylinder 39 pivotally carried by the guide plate 24 and having an extensible piston connected to a lever arm 40 keyed on shaft 36. Other suitable mechanism for rotating shaft 36 could be employed if desired.

Each transfer device 35 also has a pair of arms 41, attached to shaft 36, which carry a mounting block 42. Each block 42 forms the central or axial portion of a loading chuck, preferably having a plurality of arcuate segments 43 which conform to the inside diameter of the bead portions of an uncured tire band. Means (not shown) associated with the block 42 and segments 43 are provided to expand the chuck so that the segments grip the inner surfaces of an uncured tire band.

*The Conveyor Mechanism of FIGS. 1–6*

The correlated conveyor mechanism particularly adapted for loading uncured tire bands of passenger car size is indicated generally by the numeral 45 in FIGS. 1–6. The frame of conveyor 45 extends to the front of the press and is preferably carried by the upright guide plates 24.

When looking into the press, as in FIG. 4, the "upper right" side of the conveyor frame includes a rectangular structural member 46 attached to the outside of the transfer device housing 37. The "lower right" side of the conveyor frame has a somewhat trapezoidal structural plate 47 attached to the inside surface of the guide plate 24 in a plane which is preferably about horizontal with the press-closed position of the crosshead 23. The "upper left" side of the conveyor frame includes a rectangular structural member 48 attached to a dual purpose plate 50 carried at the upper end of a vertical I-beam 38' attached to the inside surface of "left" side guide plate 24'. The plate 50 preferably supports both the frame member 48 and the "left" side end of the transfer device shaft 36. The "lower left" side of the conveyor frame has a structural plate 49, similar to plate 47 and also attached to the inside surface of guide plate 24'.

The frame of conveyor 45 further includes a "right" side and a "left" side span member. The two span members extend outwardly from the press in an overhanging or cantilevered manner, and cooperatively define and guide movement of the actual band conveying element 60, as described in detail below. In the press of FIGS. 1–6, each span member is identical except for being opposite hand.

Figure 2:
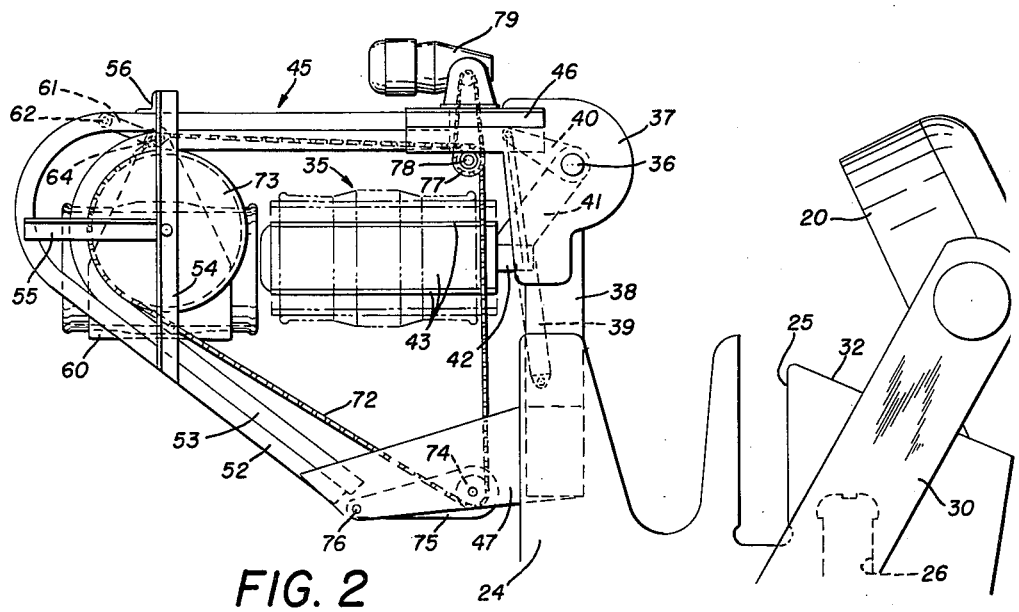
FIG. 2 is a fragmentary elevation of the press of FIG. 1 showing the mold sections open and the conveyor mechanism positioning an uncured band for engagement by a transfer device.
Figure 3:
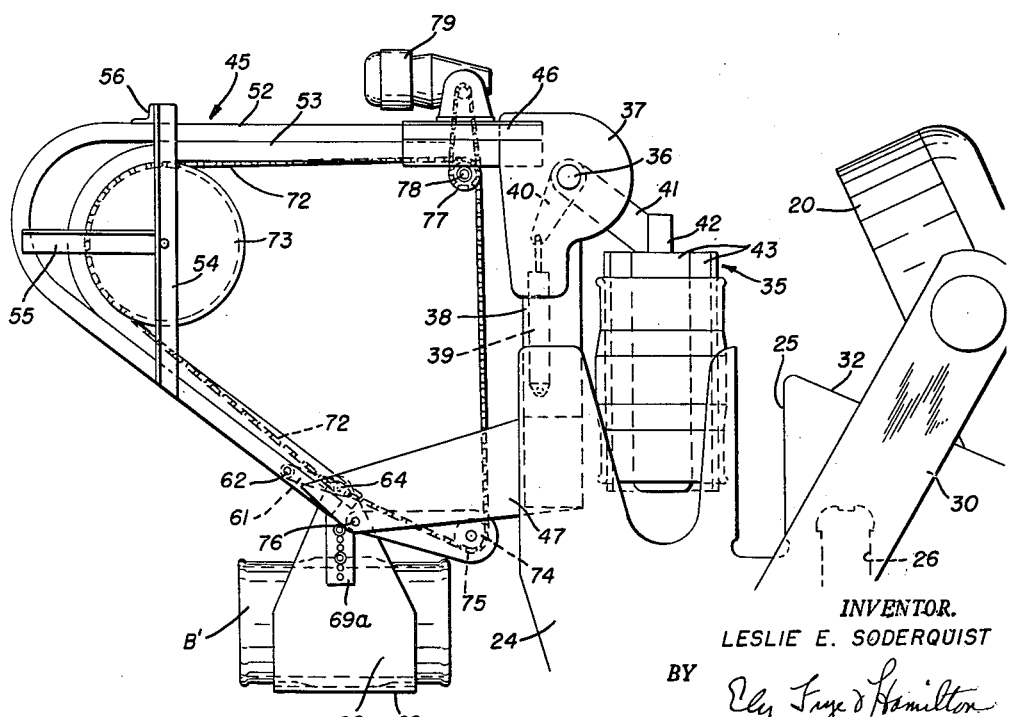
FIG. 3 is similar to FIG. 2 and shows the conveyor mechanism in its lower position for receiving the next uncured band from a delivery means while the transfer device is registering the preceding uncured band with a lower mold section.

As shown best in FIGS. 1–3, a "right" side span member includes two cooperating channel iron structures. There is an outer track or rail 52 and an inner track or rail 53. The upper end of each rail is attached to structural member 46. The lower end of each rail is attached to structural plate 47. Generally speaking, the rails are formed in an outwardly projecting V-shape with the inner rail 53 closely conforming to the configuration of the outer rail 52 except at their apex regions where an area of divergence is provided for the purpose described below. Adjacent the apex portion of each rail it is preferred that structural bracing be provided. Such bracing may be in the form of a vertical channel section 54 and an intersecting channel section 55. The "left" side span member is preferably identical in construction and the two span members may be tied together by a cross channel section 56.

Each pair of rails 52 and 53 provide a closed path or guide for movement of a trolley or wheeled carriage for the band conveying elements or pans 60. Referring to the third sheet of drawings (FIGS. 4–6), each side of the trolley structure includes a short rectangular member 61 having axle bars extending within the rails 52 and 53. The follower axle bar 62 carries a roller, wheel or disc 63 which has a diameter closely conforming to the interior width of rail 52. The lead axle bar 64 carries a similar roller, wheel or disc 65 conforming to rail 53. The follower axle bar 62 terminates at the member 61 and is secured by a fastening element 66. The lead axle bar 64 extends through the rectangular member 61 to provide a stud or hanger for a preferably fixed pan support rod 67 extending between the left side and right side trolley carriages. The upper end of a pair of support flanges 68, one pair for each pan 60, are attached to the cross rod 67. The lower end of each pair of support flanges terminates in a specially shaped pan portion 69 for carrying an uncured tire band. Suitable means indicated at 69a may be provided for adjustment of the height of pans 60 to accommodate uncured bands of different bead diameters.

Referring specifically to FIG. 6, between the rectangular member 61 and the inner rail 53, each axle bar 64 carries a pivotally mounted connector or link 70. The link 70 connects the ends of endless chains 72 which actuate the conveyor movement.

Referring to FIGS. 1–3, each chain 72 is trained around a set of three rotatable support members. There is a large idler pulley 73 adjacent the apex region of the span members, preferably carried by a vertical brace 54. There is a second or smaller idler sprocket 74 carried at the movable end of a sprocket arm 75, pivotally mounted as at 76, on the lower inside corner of each structural plate 47 or 49. Each chain is driven by a drive sprocket 77 carried at the end of a shaft 78 extending between the span members and journaled on the structural members 46 and 48. The shaft 78 is connected by suitable linkage to the output shaft of a low output r.p.m. gear motor 79.

The conveyor mechanism 45 operates as follows. An uncured tire band B is unloaded from delivery apparatus (not shown) and is placed in the conveyor pan 60 at its lowermost position. This condition is illustrated in FIG. 1. The conveyor gear motor 79 is then started to drive the chains 72 in a clockwise direction when the press is viewed as in FIG. 1. The trolley structure with rollers 63 and 65 engaged in the rails 52 and 53, respectively, moves toward the apex region of the span members. During this period of movement, the axle bars 62 and rollers 63 precede the axle bars 64 and rollers 65. However, as described above, at the apex region of the span members the rails 52 and 53 diverge. At the greatest width of divergence, the spacing between rails 52 and 53 is the same as the distance between the axle bars 62 and 64 as carried by the short rectangular member 61. This permits the axle bars 64 to smoothly move ahead of axle bars 62 at the outer end of the span members and maintain the members 61 of the trolley structure in the same relative position, as at the beginning of the conveyor movement, during final movement toward the transfer devices 35. The movable mounting of the lower idler sprocket 74 compensates for the decrease in the effective length of the chains 72 during this period of motion. This condition is illustrated in FIG. 2.

Suitable electrical control switches (not shown) may be provided to stop the conveyor drive motor 79 unless the transfer devices 35 are in the position of FIG. 2, that is, in a position to receive the bands B on the conveyor pans 60. When the transfer devices are in correct position, the trolley structure advances in its maintained and predetermined attitude from the outer end of the span members until the uncured bands B are aligned with or in loading relation to the transfer devices 35. As shown by the chain lines of FIG. 2, the axis of the uncured band B, while aligned with and parallel to the axis of the transfer device 35, is preferably slightly lower so that expansion of the chuck segments 43 will pick up or lift the band B from the conveyor pan 60. When in this position, additional suitable electrical control switches may be provided to expand the chuck segments 43, to reverse the conveyor motor 79, and to move the transfer devices.

Referring still to FIG. 2, if desired, other additional suitable electrical control switches could be provided to position the trolley structure and a conveyor pan 60 at any desired intermediate position above the floor, preferably adjacent the outer ends of the span members. Thus, in actual operation, two uncured bands B, one on the transfer device 35 and one on the pan 60, will be immediately available for loading on the lower mold section 21 at intervals determined by the curing cycle of the tire. This feature is particularly advantageous when a bank of several presses, requiring variable cure times, are being controlled by a single operator.

FIG. 3 illustrates the condition wherein the conveyor pans 60 have been returned to their lowermost position and have received the next bands B', while the transfer devices 35 have moved the preceding bands B into registry with the lower mold sections 21.

*The Conveyor Mechanism of FIGS. 7–12*

The correlated conveyor mechanism particularly adapted for loading heavy uncured tire bands of larger or truck size is indicated generally by the numeral 90 in FIGS. 7–12. The frame of conveyor 90 extends to the front of the press and is preferably carried by the plates 24.

The frame of conveyor 90 includes a "right" side and a "left" side span member. The two span members extend outwardly from the press in an overhanging or cantilevered manner, and cooperatively define and guide movement of the actual band conveying element 110, as described in detail below. In the press of FIGS. 7–12, each span member is identical except for being opposite hand.

The two span members are formed by a pair of side beams 91 connected at their inner ends by a cross beam 92a. The beams 91 and 92 are preferably welded together and supported by brackets 93 carried at the upper ends of the vertical I-beams 38 in a manner such as not to interfere with operation of the transfer devices 35. The outer ends of the beams 91 are preferably strengthened and supported by suitable side struts 94 extending upwardly from the guide plates 24. If desired, the span members may be further strengthened by additional cross beams such as indicated at 92b.

As best shown in FIGS. 9–12, on the inside of the outer end of each side beam 91 is a short shaft 95. Each shaft 95, which is preferably carried by an adjustable mounting block 96 pivotally connected to a beam 91, provides an axle for a chain sheave 97 and a cable sheave 98. The sheaves 97 and 98 are rotatably journaled on a shaft 95 and are secured by a fastening element 99.

Extending between the inner ends of side beams 91 is a long cross shaft 100, rotatably journaled in suitable mounting means. Adjacent a side beam, each end of shaft 100 carries an attached chain sprocket 101 and cable drum 102. The "right" side of shaft 100 is connected by suitable linkage to the output shaft of a low output r.p.m. gear motor 104. Each rear sprocket 101 is connected to a front sheave 97 by an endless chain 105.

Figure 7:
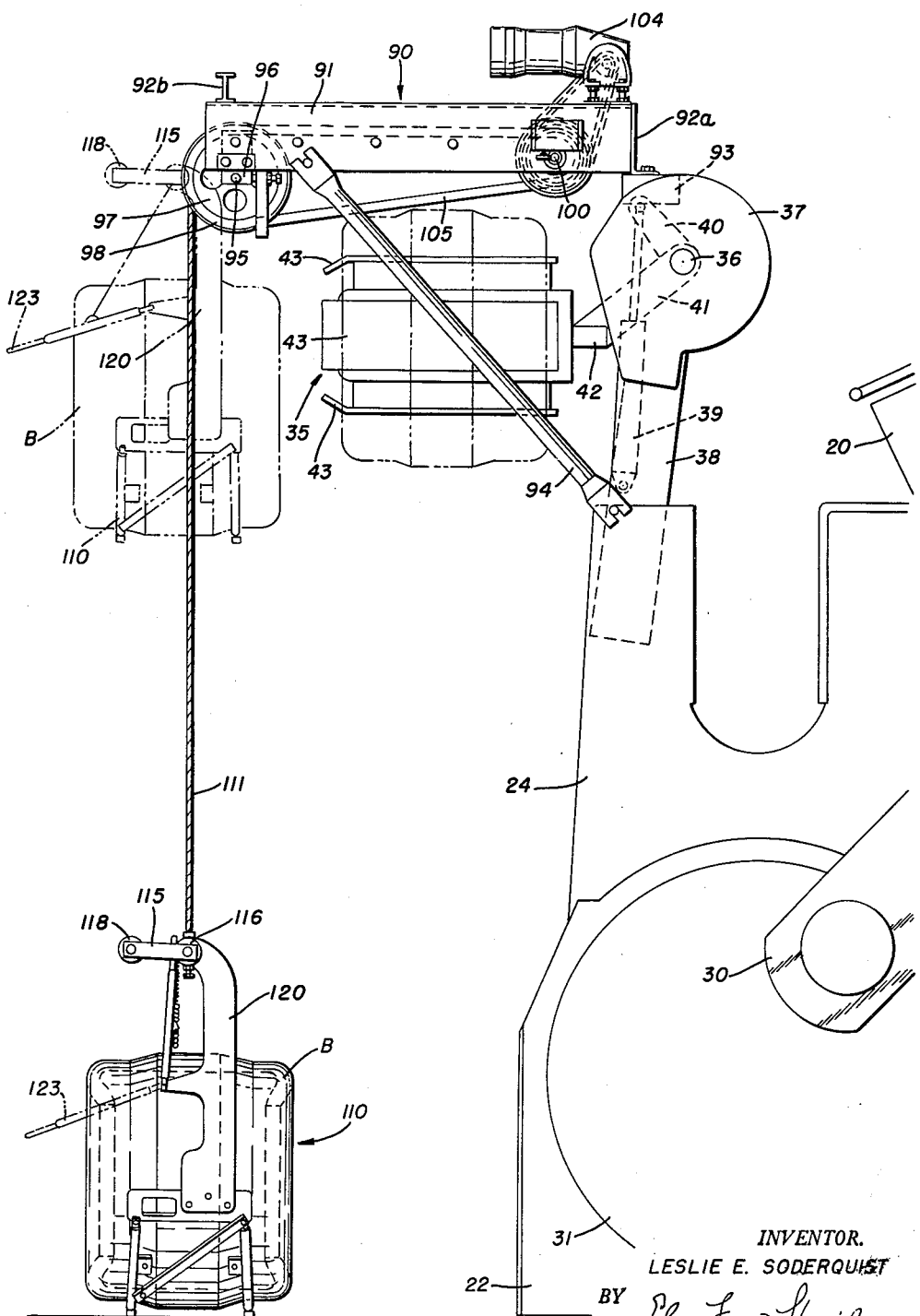
FIG. 7 is a side elevation of a press and correlated conveyor mechanism for unvulcanized tire bands of a larger or truck size.
Figure 8:
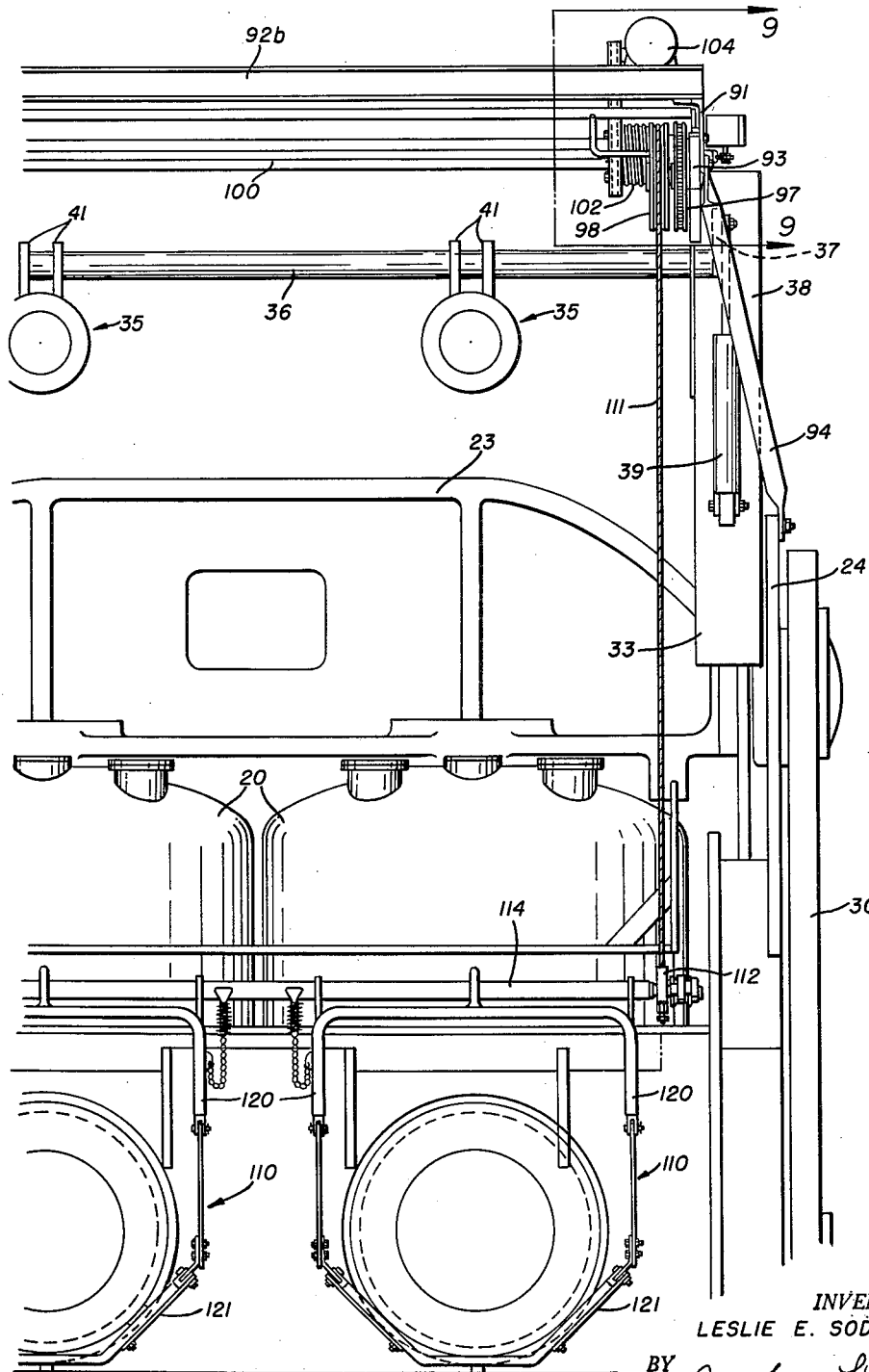
FIG. 8 is a front elevation of the press and correlated conveyor mechanism as seen in the positions of FIG. 7.

The band conveying elements or pans 110 are raised to the outer end of the span members by cables 111 attached to the cable drums 102 and trained over the idler front sheaves 98. Each cable 111 is connected to the side of a trolley structure for the pans 110. As shown in FIGS. 7 and 8, the lower end of each cable 111 is connected to a bracket 112 which provides a hanger for a free swinging pan support rod 114 extending between the left side and right side trolley carriages.

The detailed construction of the trolley or wheeled carriages is shown in FIG. 12. At each end of the support rod 114 is fixed a short rectangular member 115. Between each hanger bracket 112 and member 115, the end of rod 114 carries a rotatable spool roller or disc 116. The outer end of each member 115 has an axle bar 117 which carries a roller, wheel or disc 118.

The support rod 114 carries the upper end of a pair of support flanges 120, one pair for each pan 110. The lower end of each pair of support flanges terminates in a specially shaped adjustable height pan portion 121 for carrying an uncured tire band. If desired, each pan portion may be equipped with a safety stop 123. After the support rod 114 and the pans 110 have been raised to the outer end of the span members, the trolley carriages move inwardly of the front support elements or sheaves 97.

As shown in FIGS. 9 and 10, attached to the inside of each side channel 91 are a series of spacer blocks 124 which carry an elongated rail block 125 which preferably has a width slightly less than the width of the link rollers of chain 105. As the trolley structure is pulled by cables 111 toward the transfer devices 35, the spool rollers 116 ride up and onto the moving chain links 105, supported by blocks 125, and the rod 114 and pans 110 are carried toward the transfer devices. Movement of the trolley structure is stabilized by the rollers 118 which ride against the under surface of horizontal flanges on each side beam 91.

The conveyor mechanism 90 operates as follows. An uncured tire from delivery apparatus (not shown) is placed in the conveyor pan 110 at its lowermost position. This condition is illustrated in FIG. 7. The conveyor gear motor 104 is then started to drive the shaft 100 in a clockwise direction when the press is viewed as in FIG. 7. The trolley structure is raised by winding cables 111 onto the cable drums 102 and moves toward the outer end of the span members. As the trolley structure reaches the outer end of the span members, the spool rollers 116 of the trolley carriages contact the links of the driven chains 105 permitting smooth movement up and over the front sheaves 97. The moving chain links 105 then carry the trolley structure during final movement toward the transfer devices 35.

Suitable electrical control switches (not shown) may be provided to stop the conveyor drive motor 104 unless the transfer devices 35 are in the position of FIG. 7, that is, in a position to receive the bands B on the conveyor pans 110. When the transfer devices are in correct position, the trolley structure advances in its maintained attitude from the outer end of the span members until the uncured bands are aligned with or in loading relation to the transfer devices 35, as shown by the upper right set of chain lines in FIG. 7. When in this position, additional suitable electrical control switches may be provided to expand the chuck segments 43, to reverse the conveyor motor 79, and to move the transfer devices and the bands B into registry with the lower mold sections 21. Also, as described above in connection with conveyor 45, the trolley structure and conveyor pan 110 could be stopped by suitable electrical control switches at any desired intermediate position above the floor to provide a bank of two bands B available for immediate loading.

*Summary*

Two forms of correlated conveyor mechanisms for the automatic loading of presses for shaping and curing unvulcanized tire bands have been shown and described. Both forms have been shown as they would be employed for use with dual type presses. However, the principles and concepts of the invention could be employed with equal facility for tire presses having only one or more than two sets of separable mold sections. Therefore, for these and other reasons as will be apparent the true scope of the invention will be determined by the scope of the appended claims.

What is claimed is:

1. In a tire press for shaping and curing unvulcanized tire bands within separable upper and lower mold sections, said press having stationary upright members on opposite sides of the mold sections and a transfer device supported between the upright members above the lower mold section, said transfer device having means thereon to grip the inner surfaces of a band and being movable to locate a band in registry with said lower mold section, span members attached to said upright members and extending outwardly therefrom, a trolley structure carried by said span members, a band conveying means carried by said trolley structure, and means on said span members for moving said trolley structure toward and over the outer end of said span members and between said span members toward said transfer device.

2. In a tire press for shaping and curing unvulcanized tire bands within separable upper and lower mold sections, said press having stationary upright members on opposite sides of the mold sections and a transfer device supported between the upright members above the lower mold section, said transfer device having means thereon to grip the inner surfaces of a band and being movable to locate a band in registry with said lower mold section, span members attached to said upright members and extending outwardly therefrom, a trolley structure carried by said span members, a band conveying means carried by said trolley structure, and means on said span members for raising said trolley structure to the outer end of said span members and between said span members toward said transfer device.

3. In a tire press for shaping and curing unvulcanized tire bands within separable upper and lower mold sections, said press having stationary upright members on opposite sides of the mold sections and a transfer device supported between the upright members above the lower mold section, said transfer device having means thereon to grip the inner surfaces of a band and being movable to locate a band in registry with said lower mold section, two parallel span members attached to said upright members, each of said span members including a horizontal portion extending outwardly from said transfer device, rail members on said horizontal portions of the span members, a trolley structure guided by said rail members, said trolley structure having a band conveying means thereon, and means for moving said trolley structure while guided by said rail members toward and over the outer ends of said span members and then toward said transfer device.

4. In a tire press for shaping and curing unvulcanized tire bands within separable upper and lower mold sections, said press having stationary upright members on opposite sides of the mold sections and a transfer device supported between the upright members above the lower mold section, said transfer device having means thereon to grip the inner surfaces of a band and being movable to locate a band in registry with said lower mold section, two parallel span members attached to said upright members, each of said span members including a horizontal portion extending outwardly from said transfer device, rail members on said horizontal portions of the span members, a trolley structure guided by said rail members, said trolley structure having a band conveying means thereon, and an endless chain running along each said rail member for moving a guided trolley structure toward and over the outer ends of said span members and then toward said transfer device.

5. In a tire press for shaping and curing unvulcanized tire bands within separable upper and lower mold sections, said press having stationary upright members on opposite sides of the mold sections and a transfer device supported between the upright members above the lower mold section, said transfer device having means thereon to grip the inner surfaces of a band and being movable to locate a band in registry with said lower mold section, two parallel span members attached to said upright members and extending outwardly therefrom, a wheeled carriage guided by each span member, a suport rod extending between said span members and carried by said carriages, a band conveying pan depending from said support rod, and means on said span members for moving said carriages toward and over the outer ends of said span members and then toward said transfer devices.

6. In a tire press for shaping and curing unvulcanized tire bands within separable upper and lower mold sections, said press having stationary upright members on opposite sides of the mold sections and a transfer device supported between the upright members above the lower mold section, said transfer device having means thereon to grip the inner surfaces of a band and being movable to locate a band in registry with said lower mold section, two parallel span members attached to said upright members and extending outwardly therefrom, a wheeled carriage guided by each span member, a support rod extending between said span members and carried by said carriages, a band conveying pan depending from said support rod, and means on said span members for raising said carriages to the outer ends of said span members and toward the upright members with said conveying pan aligned in loading relation with said transfer device.

7. In a tire press for shaping and curing unvulcanized tire bands within separable upper and lower mold sections, said press having stationary upright members on opposite sides of the mold sections and a transfer device supported between the upright members above the lower mold section, said transfer device having means thereon to grip the inner surfaces of a band and being movable to locate a band in registry with said lower mold section, two parallel span members attached to said upright members, rotatable support elements at the outer end of each span member, guide means on the opposed faces of said span members inwardly of said support elements, a wheeled carriage adapted for engagement with each guide means, a support rod extending between said span members and carried by said carriages, said rod dependingly carrying a band conveying pan, and means on said span members trained over said support elements for moving said carriages toward the upright members with said conveying pan aligned in loading relation with said transfer device.

8. A conveyor mechanism for use with a press for shaping and curing unvulcanized tire bands, said press having upright side frame members and a device for receiving and transferring tire bands from said mechanism to an operative position with respect to said press, comprising, parallel span members adapted for attachment at their inner ends to said frame members, rotatable support elements at the outer end of each span member, a trolley structure extending between and guided by said span members, a tire band conveying element carried by said trolley structure, and means on said span member trained over said support elements for moving said trolley structure over the outer ends of said span members and between said span members toward said frame members.

9. A conveyor mechanism for use with a press for shaping and curing unvulcanized tire bands, said press having upright side frame members and a device for receiving and transferring tire bands from said mechanism to an operative position with respect to said press, comprising, parallel span members adapted for attachment at their inner ends to said frame members, vertically spaced apart rail members on the opposed faces of the span members outwardly of said frame members, a trolley structure extending between said span members and having means thereon engaging said rail members in a predetermined attitude, a tire band conveying element carried by said trolley structure, and means on said span members for moving said trolley structure toward and over the outer ends of said span members and toward said press while said trolley structure is being guided by said rail means.

10. A conveyor mechanism for use with a press for shaping and curing unvulcanized tire bands, said press having upright side frame members and a device for receiving and transferring tire bands from said mechanism to an operative position with respect to said press, comprising, two parallel span members adapted for attachment at their inner ends to said frame members, rotatable support elements at the outer end of each span member, guide means on the opposed faces of said span members inwardly of said support elements, a wheeled carriage adapted for engagement with each said guide means, a support rod extending between said span members and carried by said carriages, said rod dependingly carrying a band conveying element, and means on said span members trained over said support elements for moving said carriages toward and over the outer ends of said span members and toward said press while said carriages are maintained in a predetermined attitude by said guide means.

11. A mechanism for use with a tire press having a device thereon for receiving and transferring unvulcanized tire bands from said mechanism to an operative position with respect to said press, comprising, a conveyor frame extending outwardly from the press in a cantilevered manner, a trolley structure adapted to be carried by said frame, opposed guide surfaces on said frame to maintain said trolley structure at a predetermined attitude, an uncured tire band pan hanging from said trolley structure, and means on said frame for first raising and then moving toward the press said trolley structure whereby an uncured tire band is delivered for loading in said press.

References Cited in the file of this patent
UNITED STATES PATENTS

| | | |
|---|---|---|
| 2,166,871 | Luertzing | July 18, 1939 |
| 2,318,310 | Hientz | May 4, 1943 |
| 2,613,823 | Johns | Oct. 14, 1952 |
| 2,781,922 | Hibbard | Feb. 19, 1957 |

FOREIGN PATENTS

| | | |
|---|---|---|
| 209,091 | Australia | Nov. 22, 1956 |